United States Patent [19]
Pitner

[11] 3,999,816
[45] Dec. 28, 1976

[54] RACE PLATE FOR A THRUST NEEDLE OR ROLLER BEARING

[75] Inventor: Alfred Pitner, Paris, France
[73] Assignee: Nadella, France; a part interest
[22] Filed: Jan. 16, 1974
[21] Appl. No.: 433,786

Related U.S. Application Data

[62] Division of Ser. No. 288,034, Sept. 11, 1972, Pat. No. 3,805,972.

[30] Foreign Application Priority Data

Sept. 21, 1971 France .............................. 71.33868
Feb. 11, 1972 France .............................. 72.04628

[52] U.S. Cl. ............................... 308/219; 308/235
[51] Int. Cl.² ................................................ F16C 19/00
[58] Field of Search ............... 308/237 R, 235, 234, 308/196, 216, 219; 214/10.5; 16/2

[56] References Cited

UNITED STATES PATENTS

| 686,617 | 11/1901 | Keiper .......................... 308/235 X |
| 2,255,971 | 9/1941 | Hall ........................... 308/237 R X |
| 2,700,751 | 1/1955 | Hallerberg ........................ 16/2 UX |
| 3,369,851 | 2/1968 | Perry et al. ........................ 308/237 |
| 3,768,115 | 10/1973 | Hoffmann et al. ...................... 16/2 |
| 3,829,184 | 8/1974 | Chevret .............................. 308/237 |

FOREIGN PATENTS OR APPLICATIONS

12,052      1907    United Kingdom ............... 308/235

*Primary Examiner*—Johnny D. Cherry
*Assistant Examiner*—Michael Mar
*Attorney, Agent, or Firm*—Robert E. Burns; Emmanuel J. Lobato; Bruce L. Adams

[57] ABSTRACT

An annular race plate for a thrust rolling bearing having the feature that at least the connection region between the radial portion of the plate acting as a race for the rolling elements and an axial portion for engaging an axial support surface of a support is provided with gaps, such as apertures having a closed-curve contour or apertures defining circumferentially spaced tabs, so as to impart resilience to the axial portion.

In the form comprising tabs the race plates may be stacked in a compact manner with tabs of one plate penetrating the gaps between the tabs of the adjoining plate.

20 Claims, 16 Drawing Figures

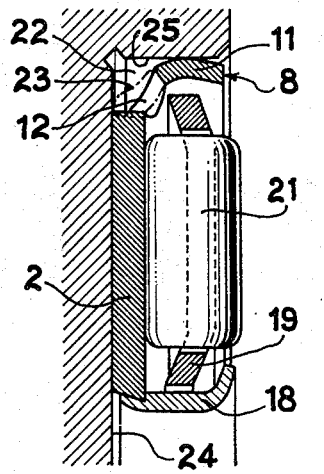
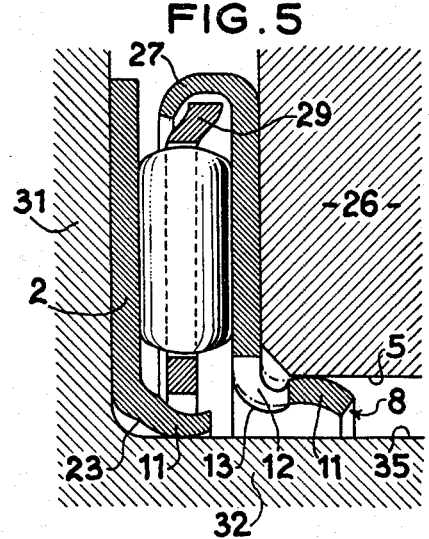
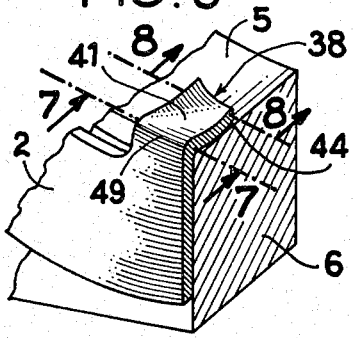
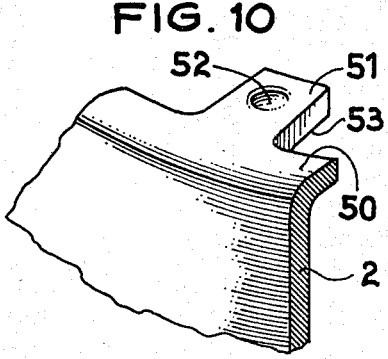
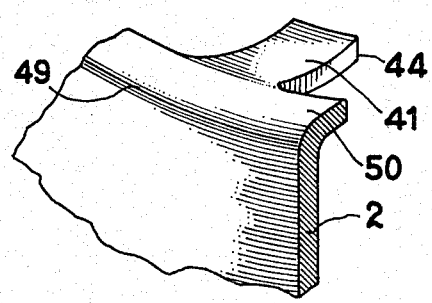

RACE PLATE FOR A THRUST NEEDLE OR ROLLER BEARING

This is a division of application Ser. No. 288,034, filed Sept. 11, 1972 now U.S. Pat. No. 3,805,972.

The present invention relates to an annular race plate for a thrust needle or roller bearing, one of the faces of the plate being adapted to bear against a radial surface of a support and the other face constituting a race for the needles or rollers.

Before the final mounting of a needle thrust bearing in the mechanical assembly in which it must be incorporated it is often necessary to maintain all or part of the thrust bearing in a positive manner on the support surface of the support. Sometimes, this is achieved by artifices, such as "adhesion" of the race plate to the support surface by means of grease. Usually, in the course of repeated handlings, these precarious artifices are unsatisfactory and practically impossible to employ under mass-production conditions of manufacture, as in the automobile industry.

In order to preclude a possible dropping of the bearings, which, apart from the local deformations of the plates carrying the races for the needles or rollers, may result in soiling or scratches which shorten the life of the bearing or even render it useless, there have been employed race plates one of the edges of which is extended by an axial portion constituting a cylindrical formed-over edge engaged in or around a shoulder of the surface acting as a support surface for the plate. This pre-assembly is in fact only a non-tight fit, since the tolerances of the parts are considerable and do not allow a precise tight fit.

A tight fit would usually result in noticeable deformations of the whole of the plate, and the race, in losing its planarity, might be rendered unsuitable for the correct rolling of the needles or rollers and might furthermore lose contact with its support and become impaired by the effect of rubbing. In extreme cases, the plate, rendered brittle by its heat treatment, might break.

Owing to the fact that the axial extension portion of the plate cannot be a tight fit in the cylindrical surface of the support, the previously proposed solution therefore does not afford with certainty an effective interconnection between the plate and the support before the final assembly.

An object of the present invention is to provide a system for retaining a race plate of a thrust needle or roller bearing on the support carrying the surface which acts as an axial support face for the plate, without deforming the plate in the part thereof acting as a race while rendering the plate easily utilisable and interchangeable both upon first assembly and subsequently when effecting repairs.

The invention provides an annular race plate comprising a plane portion having one face adapted to bear against a radial surface of a support and another face which constitutes a race for the needles or rollers, said plane radial portion being extended by an axial portion which comprises a support region adapted to engage an axial support surface of said support which is for example cylindrical and a region of connection with the plane portion, wherein the axial portion has on all or part of its circumferential extent a circumferential discontinuity which imparts resilience thereto.

Owing to this resilience, the axial portion can be fitted tightly against the cylindrical surface of the support with an intensity which varies with the tolerances but which effectively retains the plate with no risk of the plane portion of the latter being subjected to dangerous stresses.

The discontinuity can be achieved by means of circumferential cut-away portions having a closed curved shape formed in the connection region or by providing tabs in the axial portion which are circumferentially spaced apart and adapted to resiliently engage the cylindrical surface of the support.

The resilience of the axial portion may be still further increased and rendered more effective by so shaping this portion that the support region has a contact of limited extent with the cylindrical surface of the support, the location of this contact being as remote as possible from the radial surface of the support.

This particular configuration may comprise an arched shape or localized deformations of the support region, the effect of which is to render the contact with the cylindrical surface of the support a substantially linear or point contact.

In order to increase the gripping action of the support region, the surface of this region which comes in contact with the cylindrical surface of the support may be subjected to a treatment which increases the adherance, for example provided with a layer of plastics material having a high coefficient of friction.

Another object of the invention is to provide an arrangement of the tabs by means of which the race plates may be stored and packed for transport under particularly rational conditions.

In this arrangement, the race plate is so arranged that, on the basis of the following notation:

D, diameter of the plane portion of the plate measured internally or externally depending on whether the tabs are disposed on the inner or outer edge of the plate;

d, diameter of the cylinder on which all of the tabs are disposed, measured externally or internally depending on whether the tabs are disposed on the inner or outer edge of the plate;

N, number of tabs;

a, circumferential dimension of the tabs; b, axial dimension of the tabs; e, thickness of the plate;

the two expressions of one of the following groups (A) and (B) are satisfactory depending on whether the tabs are disposed on the inner edge or outer edge of plate:

(A) $d \leq D$
$ab \leq \frac{\pi d}{N} e$ (B) $d \geq D$
$ab \geq \frac{\pi d}{N} e$ If the first term of the second expression of each group differs very slightly from second term, it is possible to obtain, by disposing the plates coaxially with respect to each other, an indefinite stacking of the plates in which the plane portions of the plates are in mutual contact and the castellations or recesses formed between the tabs of each of the plates are practically entirely occupied by the subjacent plate tabs. Thus it is possible to achieve a particularly compact packing which furthermore facilitates the counting of the parts owing to the fact that the stack can consist of the superimposition of packs of plates each of which packs comprises the same number of plates.

Several embodiments and modifications of the race plate according to the invention will be described by way of example with reference to the accompanying drawings, in which:

FIG. 4 is a radial sectional view of a thrust needle bearing the race plate of which is retained in a recess of a support;

FIG. 5 is a radial sectional view of a thrust needle bearing comprising two race plates retained on separate supports;

FIG. 6 is a partial perspective view of a race plate retained in a support by means of tabs which bear tightly against a bore in the support;

Figure 11:
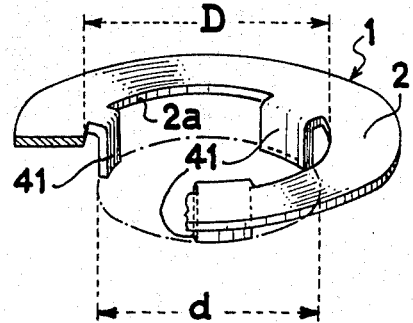
Figure 12:
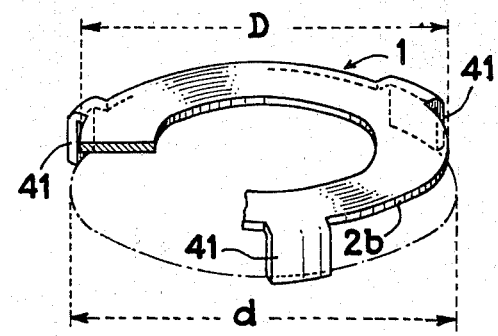
Figure 13:
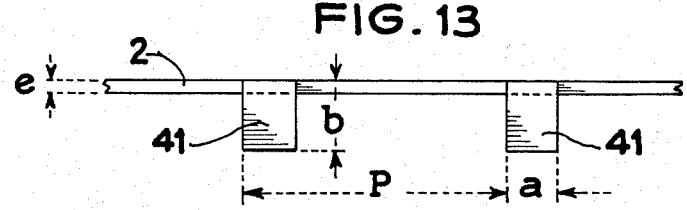
Figure 14:
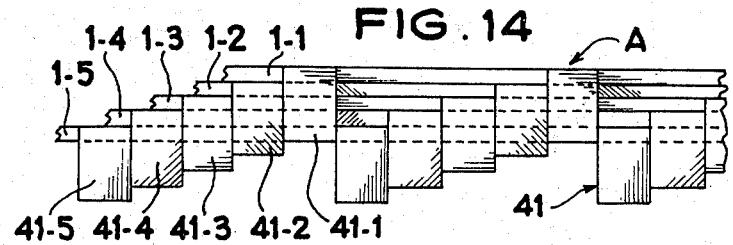
Figure 15:
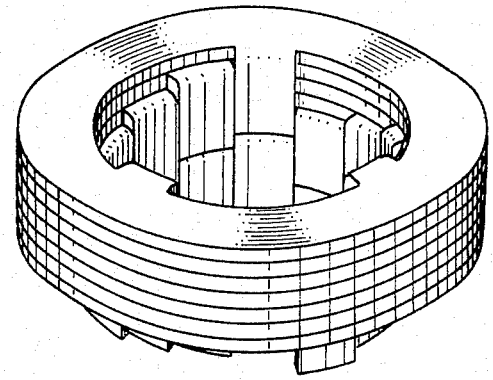
Figure 16:
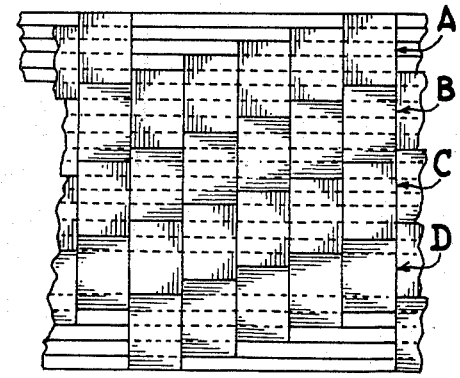

FIGS. 7 and 8 are sectional views taken respectively on lines 7—7 and 8—8 of FIG. 6;

FIG. 9 is a partial perspective view of a modification of the plate shown in FIG. 6;

FIG. 10 is a partial perspective view of another modification of the plate shown in FIG. 6;

FIG. 11 is a perspective view of a third modification of the plate shown in FIG. 6;

FIG. 12 is a view similar to FIG. 11 of a plate whose tabs are disposed on the outer edge of the plate;

FIG. 13 is a partial diagrammatic view of the plate shown in FIG. 11 which is developed along the inner cylinder on which the tabs are arranged;

FIG. 14 is a partial view of a stack of five plates of the type shown in FIG. 11 developed as in FIG. 13;

FIG. 15 is a perspective view of a number of plates of the type shown in FIG. 11 in stacked relation, and FIG. 16 is a partial diagrammatic view of a stack of four packs of plates of the type shown in FIG. 14.

Figure 1:
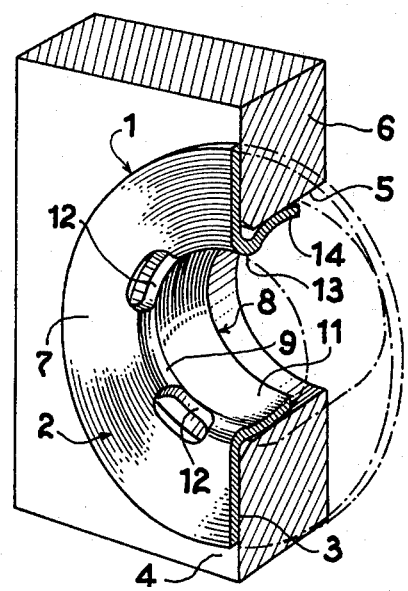
FIG. 1 is a perspective and sectional view of a thrust bearing race plate connected to a support by the tight fit of an axial portion of the plate in a bore of the support.

The race plate 1 shown in FIG. 1 comprises a plane portion 2 having a surface 3 which is applied against a plane radial surface 4 of a support 6 and another surface 7 constituting a race for the needles (not shown) of a thrust rolling bearing. The inner edge of the plane portion 2 is extended by an axial portion 8 which comprises a connection region 9 adjoining the plane portion 2 and a support or bearing region 11 which resiliently engages a bore 5 in the support 6 so as to maintain the plate 1 in position before the final assembly of the thrust bearing.

The radial resilience of the axial portion 8 of the plate is due to the presence in the connection region 9 of oblong cut-away portions or apertures 12 which result in a circumferential discontinuity and to a suitable configuration of the axial portion 8 characterized firstly by an arched shape or camber 14 given to the continuous support region 11 which imparts a convex profile to the surface of the region 11 adjacent the bore 5 the effect of which is to afford a substantially linear contact and secondly by the beading shape 13 given to the connecting region 9 which spaces the plane portion 2 away from the line of contact between axial portion and the bore 5.

Figure 2:
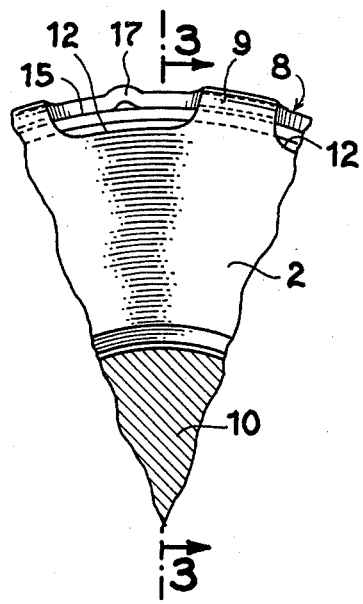
FIG. 2 is a partial elevational view of a modification of the plate shown in FIG. 1.
Figure 3:
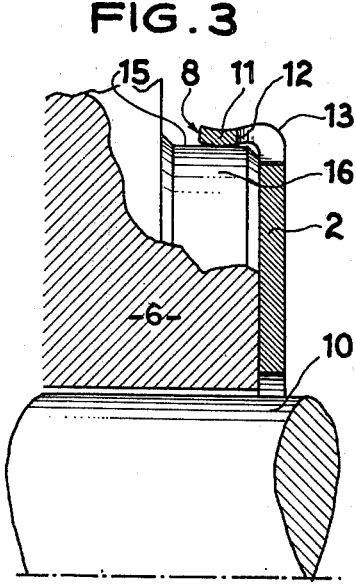
FIG. 3 is a sectional view taken on line 3—3 of FIG. 2.

In the modification shown in FIGS. 2 and 3, the axial portion 8 extends the outer edge of the radial portion 2 and not the inner edge as shown in FIG. 1 and this axial portion grips the cylindrical surface 15 of a shoulder 16 of the support 1 through which a shaft 10 extends. FIG. 3 clearly shows the projecting shape of the beading 13 which has an outside diameter exceeding that of the arched or cambered support region 11 and has in radial section an extent exceeding that of a connection region whose radial section is in the form of a quarter of circular ring. Note the presence in this region of axially extending corrugations 17, substantially in alignment with the cut-away portions 12, which contribute to impart resilience to the axial portion 8.

The race plate shown in FIG. 4, which comprises on its inner edge a collar 18 which is engaged with the plate by a forming-over operation and axially retains a cage 19 for guiding the needles 21, has its plane portion 2 applied against the bottom 24 of a recess 22. The arched support region 11 of the axial portion 8 of the race plate is tightly applied against a cylindrical wall 25 of the recess 22. In order to space as far as possible the line of contact between the support region 11 and the cylindrical wall 25 away from the plane portion 2 the connection region 9 is deformed in such manner as to have a counter-arched or cambered shape 23 which defines a concave surface facing the corner of the recess 22.

FIG. 5 shows a thrust needle bearing comprising two race plates in accordance with the invention, one of which bears against a support 26 and is extended on its outer edge by a formed-over flange 27 which retains the cage 29 and on its inner edge by an axial portion 8 arranged in the same way as the portion 8 shown in FIG. 1. The plane portion 2 of the other race plate bears against a shoulder 31 of a shaft 32 having a cylindrical surface 35 gripped by a support region 11 arranged as shown in FIG. 4.

FIG. 6 shows a support region of the axial portion 38 of a race plate which is constituted by circumferentially spaced tabs 41 which are a tight fit in the bore 5 of the support 6. The tabs 41 have in the part thereof adjacent the radial portion, that is, in the connection region 49 a rectangular section (FIG. 7) and in the part thereof adjacent their free ends a curved section (FIG. 8) due to a transverse arched or cambered shape which is combined with the longitudinal arched or cambered shape 44 shown in FIG. 6.

Owing to the small circumferential extent of the connection region 49 in the arrangement shown in FIG. 6 it is possible, with a small pressure exerted on the radial portion 2 of the plate, to improve the planarity of this portion in use should it have a slight deformation, due, above all, to the heat treatment thereof.

In the modification shown in FIG. 9, the connection region 49 is extended axially by forming substantially a rib 50 which tends to render the plane portion 2 of the race plate indeformable.

Whereas the tabs 41 shown in FIGS. 6 and 9 are bent, the tabs 51 constituting the support region of the race plate shown in FIG. 10 are plane. The tabs 51 each tightly engage the corresponding surface of the support through a point contact owing to the provision of bosses or projecting portions 51 formed by a localized impression in the metal.

By way of a modification of the arrangement shown in FIG. 10, the plane tabs 51 may tightly engage the cylindrical surface of the support by means of the axially extending outer edges 53 of the tabs 51, the bosses 52 being omitted.

As another modification of the arrangement shown in FIG. 10, the tabs 51 may each have a variable radial section so as to have uniform bending strength, that is to say a section which decreases in the direction of the free end of the tab. This affords the advantages of maximum resilience, the possibility of engaging the tabs in a space between a bore such as bore 35 and a shaft, such as shaft 5 (FIG. 5) which is hardly greater than the thickness of the tabs and the avoidance of the concentration of forces due to the deformation.

The race plate 1 shown in FIG. 11 comprises tabs 41 which are circumferentially spaced apart, and connected with the inner edge 2a of the plane portion 2 and are plane as in the arrangement shown in FIG. 10.

The diameter da of the imaginary cylinder on which the outer surfaces of the tabs 41 are arranged is less than the diameter D of the inner edge 2a of the plane portion 2 so that the tabs 41 are located radially inwardly of the inner edge 2a. It is therefore possible to superimpose a plurality of plates by applying the plane portions 2 in face to face relation and circumferentially offsetting the tabs 41 of the respective plates.

In order to produce a pack A of plates 1 under optimum conditions it is advisable that the castellations formed in the upper plate 1 (FIG. 14) between two successive tabs 41 be entirely filled by the tabs of the subjacent plates 1—1 to 1–5. This condition is satisfied when the distance P between the corresponding axial edges of two successive tabs 41 is a multiple of the width $a$ of the tabs, which condition can be expressed as follows:

$$P = \frac{\pi d}{N} = qa \tag{1}$$

in which N is the number of tabs;
and $q$ is a whole number equal to 5 in the illustrated example.

It is possible to arrange that the pack A of plates shown in FIG. 14 be superimposed on an identical pack B whose tabs 41 have the same orientation as in the pack A and whose homologous elements, namely plane portion 2 and tabs 41, are exactly contiguous. Such an assembly of superimposed packs is shown in FIG. 15 in which it is clear that the simultaneous conditions of exact interpenetration of the tabs 41 and the contact of the plane portions 2 of the adjacent packs are satisfied if the axial dimension $b$ of the tabs 41 is a multiple of the thickness $e$ of the plate equal to the multiple defined hereinbefore for the relation between the distance P and the width $a$ of the tabs, which means that the following equation must be satisfied:

$$D = q\,e \tag{2}$$

Comparison of the two equations (1) and (2) leads to the condition:

$$a = \frac{\pi d}{N}\frac{e}{b}$$

which in order to take into account the clearances to be provided, must be expressed thus:

$$a \leq \frac{\pi d}{N}\frac{e}{b} \tag{3}$$

It will be clear that the width $a$ of the tabs must be only slightly less than the second member of the aforementioned expression (3), which is expressed by the following relation in combination with (3):

$$a \neq \frac{\pi d}{N}\frac{e}{b}$$

The same reasoning employed in the case of tabs disposed on the outer edge 2b of the plate (FIG. 12), by designating by D and $d$ respectively the diameter of the edge 2b and the inside diameter of the imaginary cylinder on which the tabs 41 are arranged, leads to the following results:

$$d \geq D$$

$$a \geq \frac{\pi d}{N}\frac{e}{b}$$

$$a \neq \frac{\pi d}{N}\frac{e}{b}$$

FIG. 16 shows a stack of plates in three superimposed packs A, B, C, the tabs of which have the same orientation and a fourth pack D disposed in vertical alignement with the pack C but with an opposite orientation of the tabs which are nonetheless contiguous with the adjacent tabs of the pack C. The plane portions of the pack C and those of the end pack D are of course not contiguous but there is obtained without increase in the axial overall size a stack which is practically without any gap and has two ends which define plane faces which facilitates handling and packing.

It will be understood that the stack can be made longer by interpenetrating in a subjacent position to the packs D one or more other pack, the tabs of which have the same orientation as those of the pack D.

Having now described my invention what I claim as new and desire to secure by Letters Patent is:

1. A thrust rolling bearing comprising rolling elements, an annular race plate comprising a plane portion having an outer peripheral edge and an inner peripheral edge and a first surface for bearing against a radial surface of a support and an opposite second surface which constitutes a race for the rolling elements which are disposed on and capable of rolling along the race in a circular path, an axial portion which extends transversely from one of said edges of the plane radial portion on a side of the plane radial portion remote from said second surface and comprises a support region for fixed engagement with an axial support surface of said support and a region of connection with the plane portion, the axial portion comprising means defining a gap extending peripherally of the axial portion which imparts resilience to the axial portion.

2. A thrust rolling bearing as claimed in claim 1, comprising a plurality of said gaps extending peripherally of the axial portion.

3. A race plate as claimed in claim 1, wherein the axial portion is so shaped that the support region has a contact with the axial surface of the support whose extent is limited and whose position is determined as a function of the desired resilience.

4. A race plate as claimed in claim 1, wherein the axial portion is so shaped that the support region has a contact with the axial surface of the support which is located toward an end of the axial portion opposed to the plane portion of the plate.

5. In an annular race plate for rolling elements of a thrust rolling bearing, the plate comprising a plane portion having an outer peripheral edge and an inner peripheral edge and a surface for bearing against a radial surface of a support and an opposite surface which constitutes a race for the rolling elements, an axial portion which extends transversely from one of said edges of the plane radial portion and comprises a support region for engagement with an axial support surface of said support and a region of connection with the plate portion; the improvement comprising the race plate having means defining a plurality of apertures having a closed-curve contour disposed substantially in said connection region, whereby resilience is imparted to the axial portion.

6. A thrust needle or roller bearing comprising: rolling elements; and an annular race plate comprising a plane portion having an outer peripheral edge and an inner peripheral edge, a first surface for bearing against a radial surface of a support, and an opposite second surface which constitutes a race for the rolling elements which are disposed on and capable of rolling along the race in a circular path, an axial portion which extends transversely from one of said edges of the plane radial portion on a side of the plane radial portion remote from said second surface and comprises a support region for fixed engagement with an axial support surface of said support and a region of connection with the plane portion, said support region being defined by a plurality of circumferentially-spaced tabs.

7. A bearing as claimed in claim 6, wherein the tabs are plane.

8. A bearing as claimed in claim 6, wherein the tabs have a part-cylindrical shape.

9. A bearing as claimed in claim 6, wherein the tabs have lateral edges for engaging the axial surface of the support.

10. A race plate as claimed in claim 1, wherein the connection region has in radial section an extent exceeding that which it should have to fit the shape of the support.

11. A bearing as claimed in claim 6, wherein the tabs extend in the axial direction and have an axially decreasing cross section which is such that the tabs have uniform bending strength.

12. A race plate as claimed in claim 1, wherein the support region has in an axial plane a longitudinal arched shape which defines a substantially linear contact with the axial surface of the support.

13. A bearing as claimed in claim 1, wherein the support region comprises localized deformations defining projecting portions affording substantially point contacts with the axial surface of the support.

14. A race plate as claimed in claim 6, wherein the tabs have an arched shape.

15. A race plate as claimed in claim 5, comprising axially extending corrugations in the support region substantially in alignment with the apertures.

16. A race plate as claimed in claim 1, wherein the axial portion of the plate has a surface condition suitable for increasing the adherence in contact with the axial surface of the support.

17. A race plate as claimed in claim 1, further comprising a coating of plastics material having a high coefficient of friction on the axial portion of the plate.

18. In an annular race plate for rolling elements of a thrust rolling bearing, the plate comprising a plane portion having an outer peripheral edge and an inner peripheral edge and a surface for bearing against a radial surface of a support and an opposite surface which constitutes a race for the rolling elements, an axial portion which extends transversely from one of said edges of the plane radial portion and comprises a support region for engagement with an axial support surface of said support and a region of connection with the plane portion; the improvement which comprises, said support region being defined by a plurality of circumferentially-spaced tabs and, on the basis of the following notation:

D, diameter of the plane portion of the plate measured internally or externally depending on whether the tabs extend from the inner or outer edge of the plane portion;

d, diameter of the cylinder on which all of the tabs are disposed, measured externally or internally depending on whether the tabs extend from the inner or outer edge of the plane portion;

N, number of tabs;

a, circumferential dimension of the tabs;

b, axial dimension of the tabs;

e, thickness of the plate; the two expressions of one of the following groups (A) and (B) being satisfactory depending on whether the tabs extend from the inner edge or outer edge of plane portion:

(A) $d \leq D$ $\qquad$ (B) $d \geq D$ $ab \leq \frac{\pi d}{N} e$ $\qquad$ $ab \geq \frac{\pi d}{N} e$ 19. A race plate as claimed in claim 18, characterized by the following relation:

$$ab \# \frac{d}{N} e$$

20. A thrust needle or roller bearing assembly, comprising: a race plate support having a support surface and a bore through said support surface; an annular race plate mounted on said support and having a major surface defining a race; and a plurality of rolling bearing elements disposed on said race; wherein said annular race plate comprises an annular planar portion having an outer and an inner peripheral edge and a first major surface bearing against said support surface and a second major surface opposite said first major surface and defining said race, a portion extending transversely from one of said edges of said planar portion and including a plurality of circumferentially-spaced tabs extending within said bore and engaged therewith to maintain said annular race plate mounted on said support, said tabs having end portions remote from said annular race plate and shaped to elastically deflect upon insertion into said bore and bear against the surface of said bore to engage therewith, and a connecting region connecting said one of said edges of said planar portion with said transversely extending portion.

* * * * *